2,927,844
PRODUCTION OF HYDROCYANIC ACID

Edgar Koberstein, Konstanz, Germany, assignor to Deutsche Gold- und Silber-Scheideanstalt vormals Roessler, Frankfurt am Main, Germany No Drawing. Application July 22, 1958
Serial No. 750,109

Claims priority, application Germany August 1, 1957

3 Claims. (Cl. 23—151)

The present invention relates to an improved process for the production of hydrocyanic acid in which hydrocarbons are reacted with nitrogen containing gases in a molten metal.

It is known that hydrocyanic acid can be prepared from methane and ammonia or other hydrocarbons and nitrogen containing gases by a catalytic conversion. Generally, platinum catalysts in the form of shaped bodies or in the form of cladding on the walls of the reaction chamber are employed as the catalyst. Furthermore, it is known that base metals or base metal compounds, for example, aluminum oxide, can be employed as the catalyst. In addition, a process has been described in which a molten metal, for example, molten silver containing relatively small quantities of platinum as the catalyst, is employed as the reaction medium.

The use of molten metals for the endothermic reaction in question provides certain advantages, as it is relatively easy to supply the heat required for the reaction through the molten metals. However, previously experiences have indicated that it was not possible to avoid the use of a catalytic noble metal in carrying out the conversion in the molten metals.

According to the invention it was unexpectedly found that noble metal free molten base metals, especially, molten copper, could be employed for the conversion of methane and ammonia as equivalent starting materials to produce hydrocyanic acid in good yields if the reaction is carried out in the presence of additional hydrogen. The additional hydrogen which can be in amounts up to 10 mols per mol of hydrocarbon can be supplied to the molten metal either in admixture with the starting gases, such as methane and ammonia, or separately from such starting gases. It is most surprising that the addition of hydrogen to the methane and ammonia converted in a catalyst free molten metal would provide increased yields of hydrocyanic acid, as it would rather be expected that such addition would, according to Le Chatelier's principle, shift the reaction equilibrium represented by the following equation $$CH_4 + NH_3 \rightleftharpoons HCN + 3H_2$$

to the left. However, as can be seen from the following examples, the addition of hydrogen substantially increases the yields of hydrocyanic acid obtained so that yields of technically interesting values are obtained.

Especially good results are obtained when the hydrogen added amounts to between 0.5 to 5 mols per mol of hydrocarbon. According to a further modification of the process according to the invention, the yields of hydrocyanic acid can be further improved by cooling the reaction gases directly after leaving the molten metal, for example, by blowing cool gases, such as nitrogen or hydrogen, on the surface of the molten metal forming the reaction space or by supplying such cool gases to the space above the molten metal. Such cool gases prevent reestablishment of the equilibrium and also serve to condense any metal vapors which are entrained by the gases leaving the molten metal.

In carrying out the process according to the invention, energy and heat can be supplied to the molten metal in a number of ways, for example, electrically, by induction heating employing various frequencies or by gas heating. Submerged burners which expediently operate on the principle of surface combustion can also be used. The molten metal in which the conversion is carried out can also be moved. For example, it can be heated up outside of the reaction chamber and can be passed through the reaction chamber, for example, by magnetic pumping. The recycled heated molten metal can, for example, be sprayed into the upper portion of a reaction space or be passed over filling bodies or other constructions which promote contact between the gas and molten metal.

The process according to the invention preferably is carried out at temperatures between 1100° C. and 1400° C.

The following examples illustrate several embodiments according to the invention:

Example 1

2.8 kg. of copper were melted down in a quartz crucible provided with a water cooled copper cover with medium frequency induction heating and maintained at 1250° C. A mixture of methane, ammonia and hydrogen was introduced into the lower portion of the molten copper through a gas distributor at a rate of one mol of each of the methane and ammonia and 5 mols of hydrogen per hour. Analysis of the gases withdrawn through the crucible cover showed that a 62.5% yield of hydrocyanic acid with reference to the throughput was attained. When the hydrogen was omitted from the gas mixture supplied to the molten copper, the yield of hydrocyanic acid was only 40%.

Example 2

The procedure of Example 1 was repeated except that 4 kg. of copper were placed in the crucible and the reaction temperature was raised to 1280° C. The yield of hydrocyanic acid obtained with the hydrogen containing gas mixture was 79.6%, whereas when the hydrogen was omitted from the gas mixture the yield was only 50.6%.

I claim:

1. A process for the production of hydrocyanic acid by conversion of a mixture of ammonia and methane which comprises contacting such mixture of ammonia and methane with molten copper heated to a reaction temperature between 1100° C. and 1400° C. and additionally supplying free hydrogen to said methane and ammonia mixture while in contact with said molten copper, the quantity of said additional free hydrogen being between 0.5 and 10 mols per mol of methane in said mixture.

2. The process of claim 1 in which the quantity of said additional free hydrogen is between 0.8 and 5 mols per mol of methane in said mixture.

3. The process of claim 1 in which the gas mixture is cooled directly after contact with the molten copper.

References Cited in the file of this patent

UNITED STATES PATENTS

| | | |
|---|---|---|
| 1,562,914 | Poindexter | Nov. 24, 1925 |
| 2,844,453 | Kapp et al. | July 22, 1958 |

OTHER REFERENCES

Serial No. 292,742, Beck et al. (A.P.C.), published July 13, 1943, abandoned.